Jan. 5, 1943. C. L. EKSERGIAN Re. 22,242

BRAKE CONSTRUCTION

Original Filed March 28, 1938 6 Sheets-Sheet 1

INVENTOR.

Carolus L. Eksergian

BY John P. Barber

ATTORNEY.

Jan. 5, 1943. C. L. EKSERGIAN Re. 22,242

BRAKE CONSTRUCTION

Original Filed March 28, 1938 6 Sheets-Sheet 2

INVENTOR.

Carolus L. Eksergian

BY John P. Parker

ATTORNEY.

Jan. 5, 1943. C. L. EKSERGIAN Re. 22,242

BRAKE CONSTRUCTION

Original Filed March 28, 1938 6 Sheets-Sheet 3

INVENTOR.
Carolus L. Eksergian

BY John P. Faber
ATTORNEY.

Jan. 5, 1943. C. L. EKSERGIAN Re. 22,242

BRAKE CONSTRUCTION

Original Filed March 28, 1938 6 Sheets-Sheet 4

INVENTOR.

Carolus L. Eksergian

BY John P. Parker

ATTORNEY.

Jan. 5, 1943. C. L. EKSERGIAN Re. 22,242

BRAKE CONSTRUCTION

Original Filed March 28, 1938 6 Sheets-Sheet 5

INVENTOR.
Carolus L. Eksergian

BY John P. Faustp
ATTORNEY.

Jan. 5, 1943. C. L. EKSERGIAN Re. 22,242

BRAKE CONSTRUCTION

Original Filed March 28, 1938 6 Sheets-Sheet 6

INVENTOR.
Carolus L. Eksergian

BY John P. Faber
ATTORNEY.

Reissued Jan. 5, 1943 Re. 22,242

UNITED STATES PATENT OFFICE 22,242

BRAKE CONSTRUCTION

Carolus L. Eksergian, Detroit, Mich., assignor to Budd Wheel Company, Philadelphia, Pa., a corporation of Pennsylvania Original No. 2,228,818, dated January 14, 1941, Serial No. 198,398, March 28, 1938. Application for reissue January 12, 1942, Serial No. 426,481

50 Claims. (Cl. 188—107)

The invention relates to brakes and more particularly to brakes of the radial disc type adapted for railway or other heavy duty use.

It is among the objects of the invention to provide a very rugged and efficient brake of this type, one which is of compact and simple construction, one which is readily detachable from and attachable to the truck as a unit, one which has simple and efficient automatic and manual actuating means, one which is provided with efficient cooling means so as to avoid overheating and one which can be manufactured at low cost.

These objects are attained in large measure by mounting the major portion of the brake mechanism on a rigid frame or yoke having widely spaced points of support on the truck axle and extending generally in a horizontal direction from the truck axle to a preferably inwardly located cross member of the truck to which the rigid frame may be secured preferably at a single point for universal movement. This frame may be of substantially V-form in plan, the legs of the V being pivotally supported at widely spaced points on the axle and the apex of the V being universally supported from the truck frame. This frame carries through lateral extensions therefrom the brake shoes and the means for supporting and actuating the shoes in substantially longitudinal alignment with the discs with which the shoes cooperate.

Other and further objects and advantages and the means by which they are attained will become apparent from the following detailed description when read in connection with the drawings forming a part of this specification.

Figure 1:
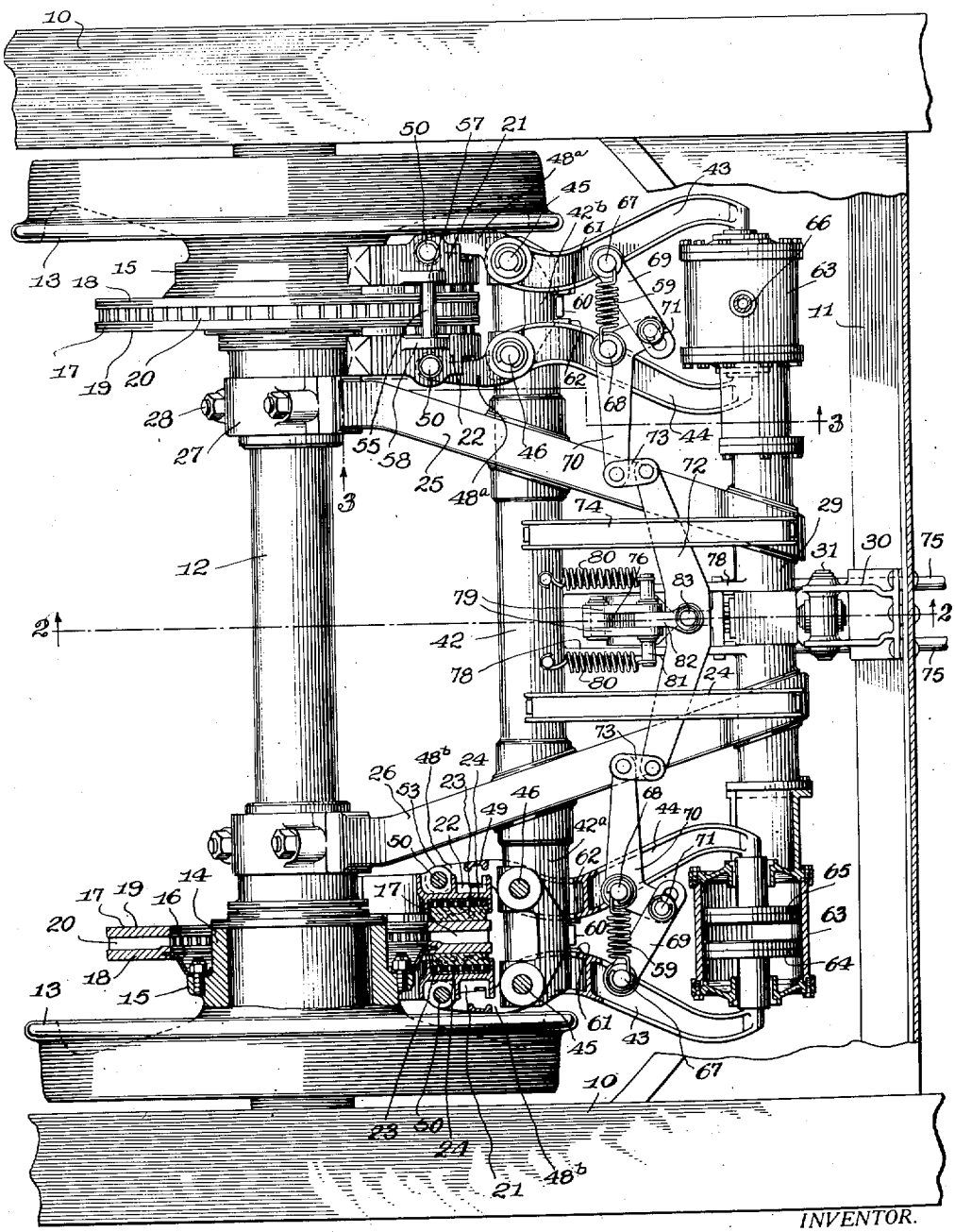
Figure 1 is a fragmentary plan view of a truck with the brake mechanism of the invention applied thereto, parts being shown in section.

In the drawings the invention is shown applied to a railway truck having side frames 10 and a cross member or transom 11 interconnecting the side frames adjacent the longitudinal central region of the truck. The axle 12 carrying the wheels 13 is mounted in any desired manner in the side frames so as to permit limited vertical and longitudinal movement between truck frame and axle. The wheels may be fixed on the axle as shown or mounted to rotate independently of the axle. In general, the truck frame and its suspension from the wheels and axles may be similar to that described in my copending application Serial No. 159,844, for Brake, filed August 19, 1937, now issued as Patent No. 2,214,762, dated September 17, 1940.

Each wheel is provided with an inwardly extending collar 14 which is provided with a flange 15 against the inner radial face of which is bolted a sheet metal web 16, to the outer periphery of which an annular brake ring 17, preferably of cast iron, is shown secured. This brake ring has on its opposite faces the annular braking surfaces 18 and 19 against which the brake shoes are adapted to bear when the brakes are applied. To provide for rapid cooling of the brake ring 17, it is formed with radial passages 20 between the surfaces 18 and 19 through which the cooling air is drawn after the manner of a centrifugal blower.

The brake discs 17 are of a large diameter and of a substantial width. The diameter is as large as is consistent with proper clearance between the trackway and the body mounted on the truck. A very efficient construction employs a brake disc of approximately 26 inches diameter and a radial width of approximately 4 inches. It will be understood that the cooling of the disc for any given arcuate extent of brake shoe will be greater and the torque exerted by the brake shoes will be greater as the diameter of the brake is increased.

According to the invention, the brake shoes 21 and 22 are arranged in pairs, as clearly appears in Figure 1, supported in position to engage the opposite braking surfaces 18 and 19 of the brake disc.

As clearly appears in Figure 1, the brake discs are symmetrically arranged at opposite sides of the center line of the truck adjacent the wheels and the pairs of brake shoes are supported in longitudinal alignment with the shoes of a pair straddling the adjacent disc.

To obtain the most efficient braking, it is desirable that the brake shoes engage a segment only of the disc so that the remaining portion of the disk is subjected to cooling action only. It has been found that the best ratio for this purpose is an arc of about 120 degrees for braking to the remaining arc of about 240 degrees for cooling.

In accordance with this, the segmental brake shoes 21 and 22 extend through approximately an arc of 120 degrees and to obtain uniform bearing pressure over the entire extent of the brake shoes, they are preferably lined with a composite brake lining 23 backed by a yielding backing, such as a rubber backing 24. The specific construction of these shoes does not form a part of the present invention and will not be described in detail herein.

Suffice it to say that the bodies of the shoes are sufficiently rigid to resist distortion so that the braking lining is pressed against the braking surfaces with substantially equal pressure throughout the area of contact. This is important to insure equal wear of the shoe and to avoid overheating of certain areas of the brake ring.

According to the invention, the brake shoes 21 and 22 and their actuating mechanism are all supported from a rigid frame lying in the substantially horizontal plane of the axle so as to support the parts carried thereby with sufficient track clearance and with sufficient clearance from the under side of the body mounted on the truck.

Figure 2:
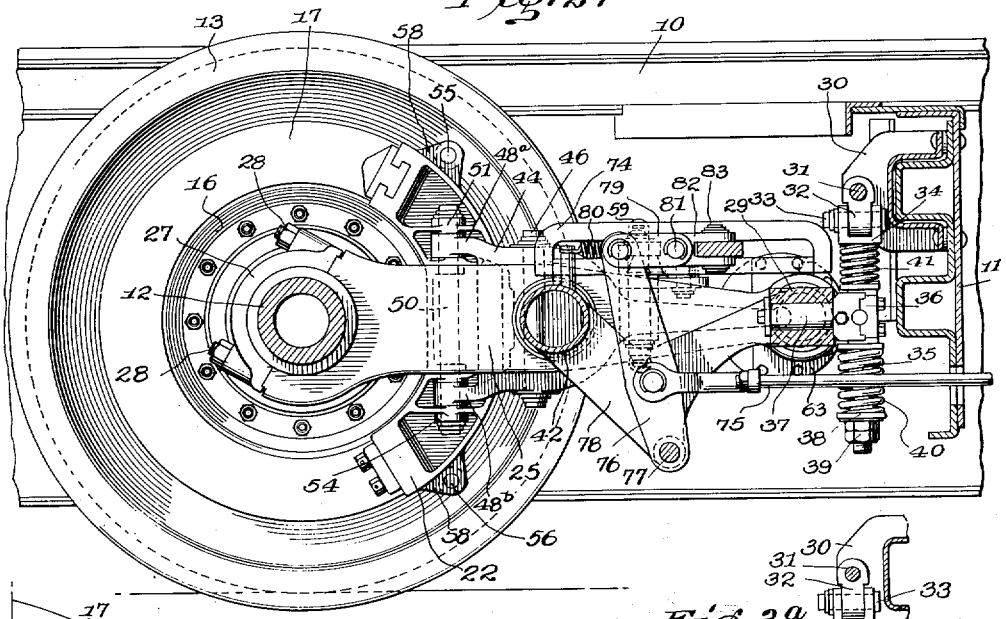
Figure 2 is a central vertical longitudinal section taken substantially along the line 2—2 of Figure 1 looking in the direction of the arrows at the ends of the section line.
Figure 4:
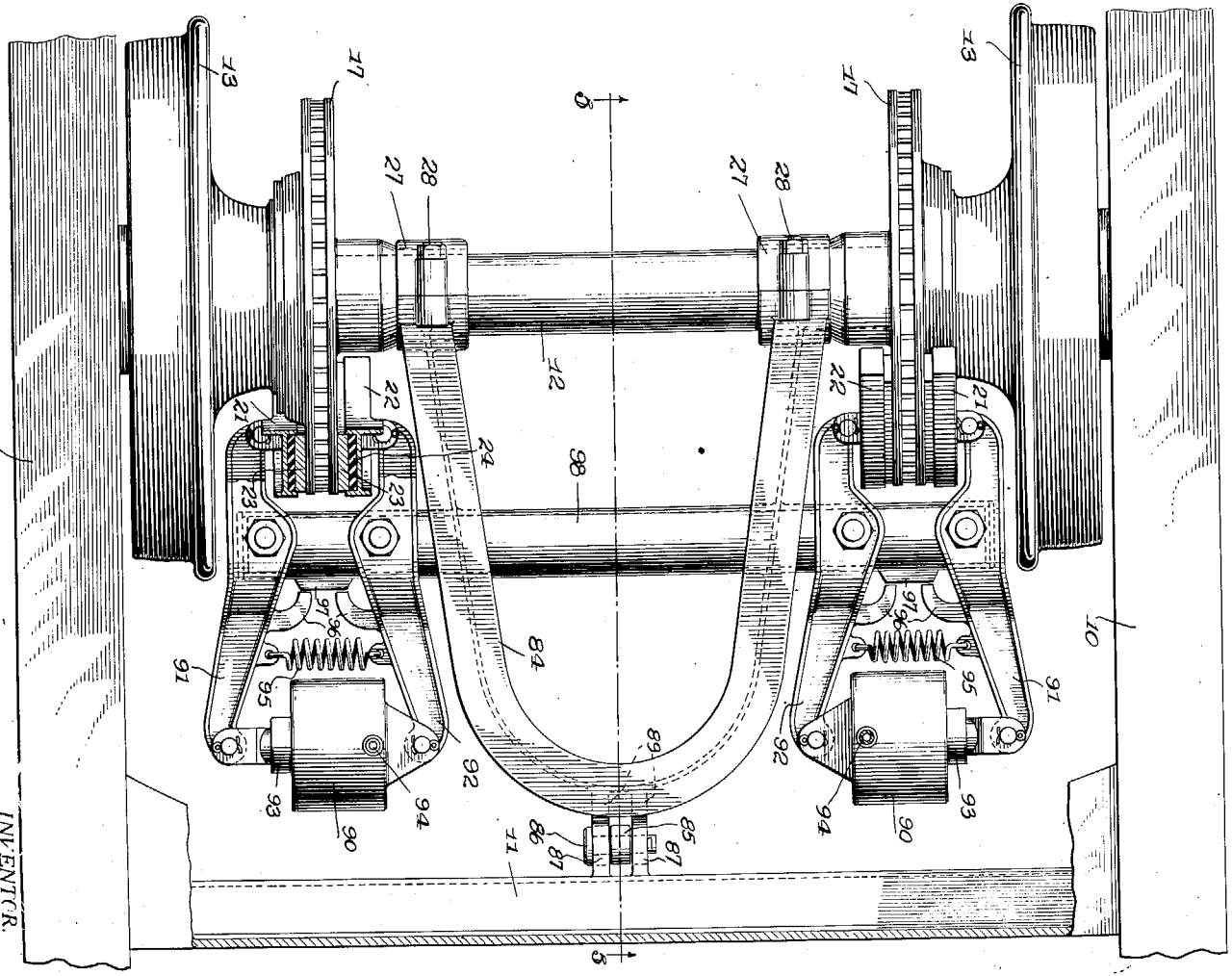
Figure 4 is a plan view similar to Figure 1 showing a modification.
Figure 7:
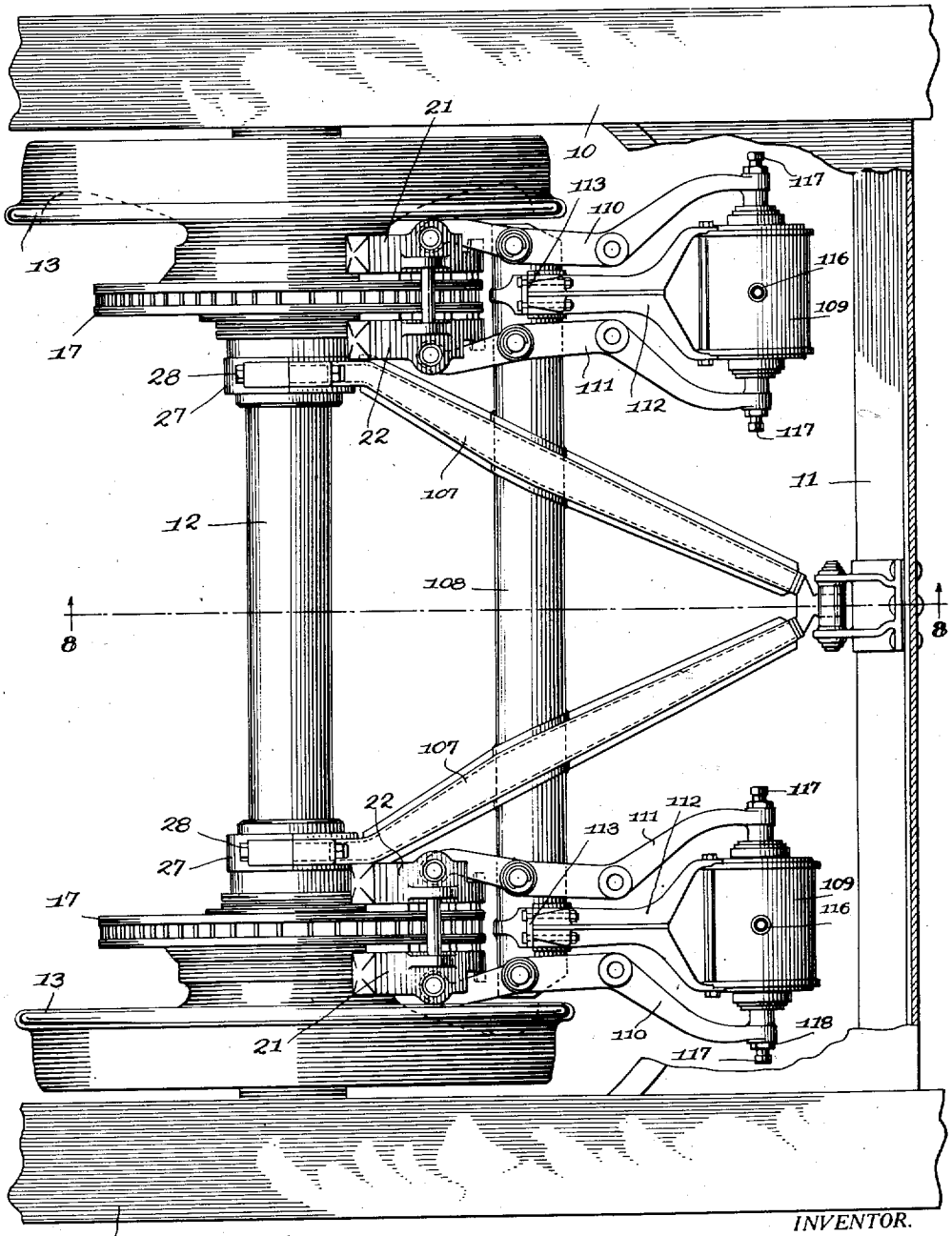
Figure 7 is a view similar to Figure 1 showing a third modification.

As shown in Figures 1, 4 and 7, this frame is generally V-shaped in plan comprising, as shown in Figures 1 and 2, rearwardly and inwardly inclined members 25 and 26 which form the legs of the V, the extremities of which are pivotally secured to the axle 12 and are readily secured to or removed from the axle by the removable semicircular caps 27 which are each held in place by bolts 28. These members 25 and 26 have their bearings on the axle widely spaced and closely adjacent respectively to one of the brake discs 17.

The members 25 and 26 are preferably, for great rigidity and light weight, of box-section construction. Their inner ends which closely approach each other are secured together by a transverse bar 29 which in turn is connected by a universal joint structure, presently to be described, to the cross member 11 of the truck frame.

Such connection may be through a bracket 30 secured to the cross member and a pin 31.

This method of mounting the frame supporting the brake structure permits its ready assembly and disassembly with the truck with most of the brake mechanism thereon. All that is necessary is to disconnect the air lines from the cylinders and the connecting rods 15 and remove the pin 31 and the bolts securing the caps 27 in place and the entire brake mechanism drops away from the axle and truck frame and can be removed as a unit. The generally V-shaped frame 25, 26, 29 carrying the brake shoes and taking the braking torque is a very rigid frame and by reason of its mounting as described, it at all times remains in the plane of the axle and no matter how much the axle moves up and down with respect to the truck frame or longitudinally due to longitudinal play, concentricity of the shoes with the brake surfaces is at all times assured. This is important so that the braking may at all times be uniform.

The universal joint construction tying the bight of the yoke 25, 26, 29 to the cross member may consist as shown in Figures 1 and 2 of the horizontal pin 31 supporting a depending link 32, which link is connected by the horizontal pin 33 to clevis 34 secured to the top of a rod 35 mounted for limited vertical sliding movement in the block 36 engaging it between its ends. This block 36 is in turn pivotally connected to the member 29 by a forwardly projecting pivot pin 37. Between the block 36 and a washer 38 secured by the lock nuts 39 adjacent the bottom of the rod 35 is arranged a coil spring 40 which cushions the weight of the brake carrying frame against shocks and normally carries the weight of that end of the frame. A similar spring 41 although of lighter capacity is arranged between the top of the block 36 and the clevis 34.

These springs also serve to cushion the initial application of the brakes but they are not of a strength to take the entire brake torque since such torque is taken after a predetermined compression of the springs through shoulders 35a on the rod 35 engaging the block 36. The lower shoulder is sufficiently spaced from the block so that the weight of the yoke and brake mechanism is cushioned by the spring 40 at all times except when the brake is applied when the torque brings one of the shoulders on the rod up against the the block 36.

By the immediately foregoing description, it will be seen that the axle can oscillate slightly bodily in longitudinal direction, that it can oscilate forwardly on one side and rearwardly on the other, and that it can oscillate vertically in the truck frame, or any combination of these without placing any strain upon the frame 25, 26, 29 tending to distort it. This is important to insure the proper engagement of the brake shoes at all times with the brake discs.

If the axle oscillates vertically on one side more than on the other, the frame can swing either about the pin 37 or about the pin 33 or both. If the axle oscillates longitudinally of the truck, this is taken care of by swinging around the pin 31 and 33 or both. It will be obvious that all motions which it is possible for the axle to make within the limits within which its movements are confined will be taken care of by the three pivots 31, 33 and 37 without placing any distorting strain upon the frame carrying the brake mechanism.

Since the brake discs are located outside of the arms 25 and 26, to properly support the brake shoes and to additionally stiffen the frame, a transverse tubular member 42 is provided interconnecting the members 25 and 26 so as to form therewith in plan substantially the letter A, this member being extended outwardly by extensions 42a and 42b to support the brake shoes. To obtain the maximum of support of the brake shoes and to place a minimum of strain upon the supporting means, this member 42 and its extensions 42a and 42b are located as close to the outer periphery of the brake disc 20 as possible. A convenient method of supporting the shoes 21 and 22 is by means of actuating levers 43 and 44 which are pivoted intermediate their ends and at a location close to the outer periphery of the shoes on the pins 45 and 46 respectively. This arrangement makes it possible for the brake torque to be taken almost wholly through the generous bearing shoulders 47, see Figure 3, between the actuating levers and the tubular extension 42b insuring that the pins 45 and 46 are not subjected to any appreciable shearing strains due to the brake torque, those minor strains occasioned by the reaction from the pressure application being substantially the only shearing strains to which the pins are subjected.

Figure 3A:
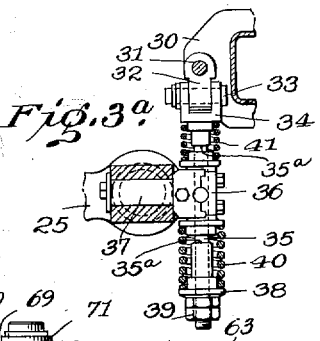
Figure 3a is a fragmentary detail sectional view through the universal suspension of the frame similar to the showing in Figure 2 except that the springs are shown in section.
Figure 3:
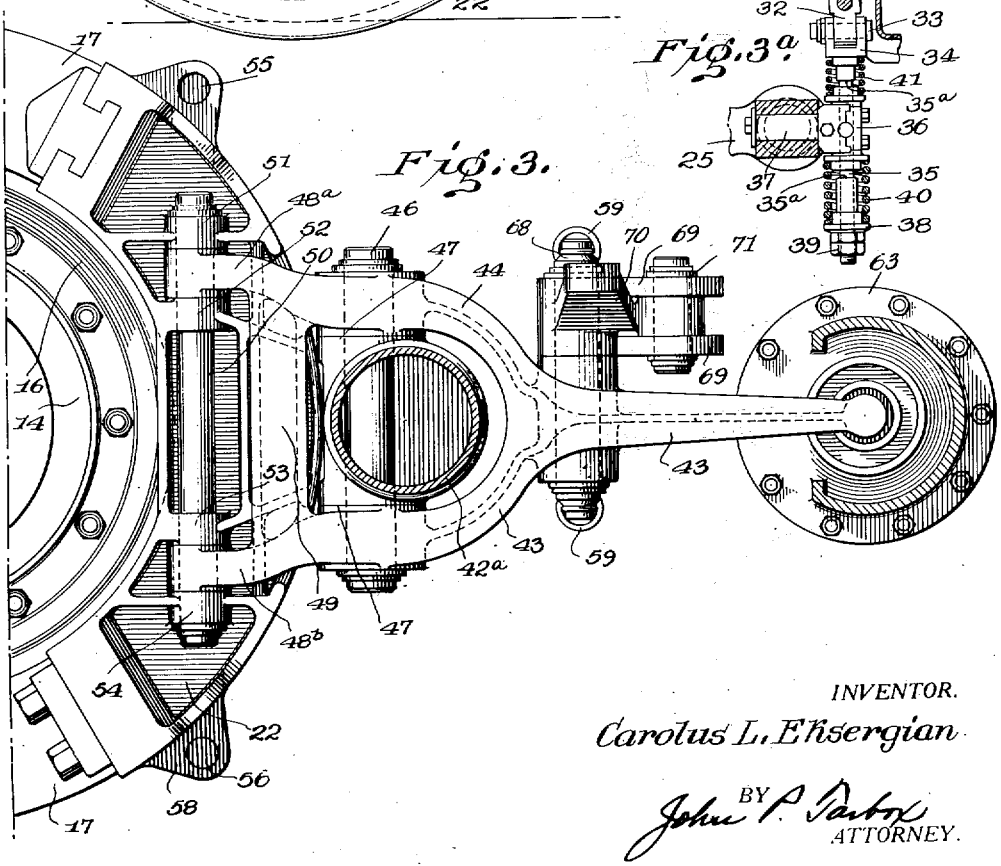
Figure 3 is a vertical longitudinal sectional view taken substantially along the line 3—3 of Figure 1 looking in the direction of the arrows at the ends of the section line, the parts being shown somewhat enlarged.

As shown in Figure 3, the brake actuating levers are bifurcated to pass around the extension 42b of the supporting member 42 and the short arms 48a and 48b of these bifurcations which support the shoes are tied together by a column member 49. The short arms 48a and 48b of the actuating lever 43 are hinged to the shoe 22 by a long hinge pin 50 which passes through the ends of the arms and spaced bearings 51, 52, 53 and 54 on the shoe. The pin 50 is arranged substantially in the transverse vertical plane of the center of gravity of the shoe.

By this arrangement all parts of the shoe are pressed against the brake disc with substantially uniform bearing pressure and the braking torque is transmitted to the arms of the actuating lever through the shouldered engagement between the bearings 51, 52, 53 and 54 and the arms thus relieving the pin 50 of substantially all shearing strains except those occasioned by the forces pressing the shoe against the brake ring.

To maintain the shoes 21 and 22 of each pair parallel to plane of the brake ring 17 and parallel to each other at all times, the aligning pins 55 and 56 are provided respectively at top and bottom of the shoes preferably substantially in line with the transverse plane passing through the axis of the pin 50. These aligning pins are rigidly secured in projecting lugs 57 on one shoe and having a sliding engagement with opposed projecting lugs 58 on the adjacent shoe of the pair.

The shoes are normally held out of engagement with the brake ring through the action of a pair of tension springs 59 tending to draw the long arms of the actuating levers 43 and 44 together. Such movement to inoperative position may be limited by stop lugs 60 on the cantilever extensions 42a and 42b cooperating with stop shoulders 61 and 62 respectively on the levers 43 and 44.

The brake shoes are normally actuated by air cylinders 63 secured to the opposite ends of the transverse bar 29, each air cylinder being provided with opposed pistons 64 and 65 acting through their outwardly extending rods respectively upon the ends of the long arms of the levers 43 and 44. Air is admitted between the pistons through a central port 66 connected with the brake line of the train.

By reason of the symmetrical arrangement of a pair of shoes and their actuating means, as hereinbefore described, about the central vertical longitudinal plane of the brake disc, it will be seen that the brake shoes 21 and 22 will be applied with substantially equal pressure to opposite sides of the disc, and by reason of the connection of the shoes to their supports and the aligning function of the pins 55 and 56, the shoes will at all times be maintained parallel to the plane of the disc and the force applied to the disc throughout the area of contact of the shoe and disc will be substantially uniform. The arrangement described will also provide for a slight lateral floating movement of the disc and shoes to compensate for any inequality of wear of the shoes or of the discs.

In addition to the normal operating means through the train air line, emergency operating means are provided. To this end the long arms of the levers 43 and 44 are provided respectively with pivot pins 67 and 68 which pivot pins are substantially in longitudinal alignment with the pins about which the arms swing and the pins 50 connecting them to the shoes. On the pin 67 is pivoted a link 69 and on the pin 68 is pivoted a bell crank lever 70, these two being connected together by a pin and slot connection 71 to permit lost motion and avoid actuation of the emergency mechanism when the brake is actuated by air. The bell crank lever 70 is connected to the link 69 through a short arm which is substantially at right angles to the link, its long arm extending inwardly toward the center of the truck. By this arrangement, it will be seen that the actuation of the long arm of the bell crank applies the brake shoes to the opposite sides of the disc with substantially equal pressure. Equalization of the operation of the pairs of shoes at the opposite sides of the truck is obtained through a transverse equalizing bar 72 connected by links 73 to long arms of the bell crank levers 70. As shown in Figures 1 and 2, this equalizing bar is mounted for longitudinal sliding movement in the guides 74 secured to the transverse frame members 42 and 29.

The emergency brake system at one end of the truck is connected to the system at the opposite end by a pair of rods 75, see Figures 1 and 2, which are pivoted on the opposite sides of a vertical lever 76 in turn pivoted at 77 to a bracket 78 secured to the frame members 42 and 29. The upper end of this vertical lever is connected by a pair of links 79 to the central portion of the equalizer bar 72. The bar is normally held in its inoperative position by tension springs 80 engaging lateral projections from the pivot pin 81 connecting the pair of links 79 to a clevis 82 which is in turn directly secured to the center of the bar 72 by a vertical pin 83.

By this arrangement, it will be seen that all of the brakes on the two axles of the truck may be simultaneously and equally applied by the emergency operating means described.

Figure 5:
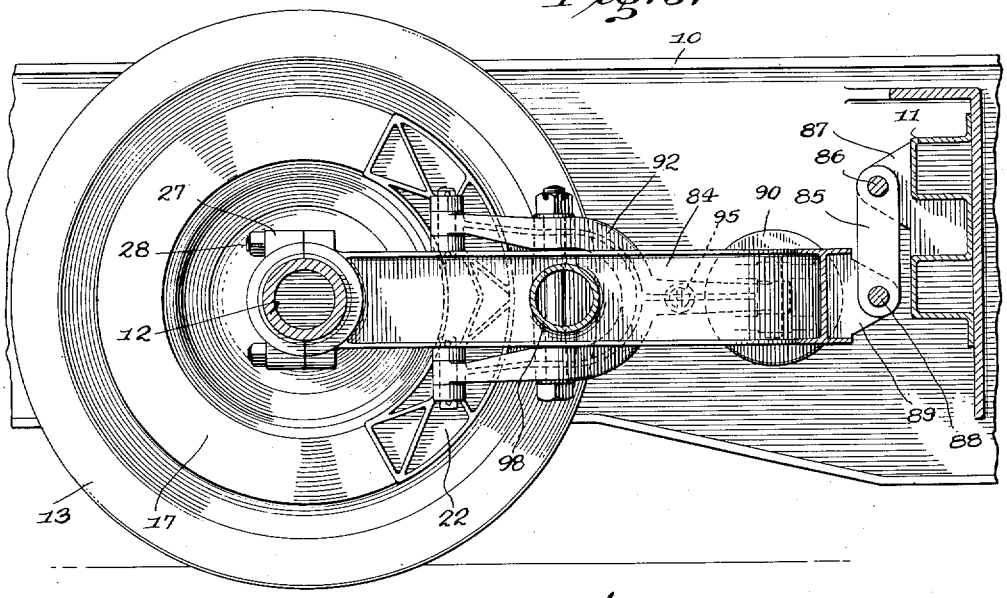
Figure 5 is a central vertical longitudinal sectional view taken along the line 5—5 of Figure 4 and looking in the direction of the arrows at the ends of the section line.
Figure 6:
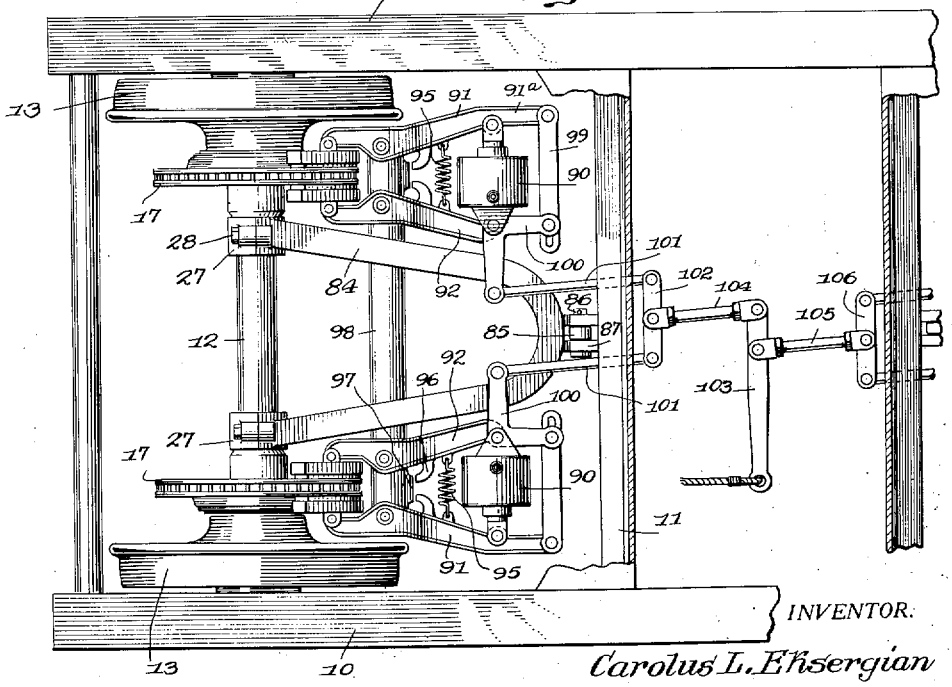
Figure 6 is a plan view showing a modification of Figures 4 and 5 on a somewhat reduced scale and showing one form of manual operating means applied to this modification.

In the modification of Figures 4, 5 and 6, a somewhat simplified form is shown in which the yoke supporting the brake mechanism is a substantially V-shaped member 84 having a rounded apex and of I-section, the legs of which are pivotally supported at their ends on the axle 12 in a manner similar to that already described, the apex of the V being supported from the transverse frame member 11 of the truck in this case by a vertical link 85 pivoted through a pin 86 to spaced lugs 87 on the transverse member 11 and through a pin 88 to spaced lugs 89 projecting from the apex of the V. The pins 86 and 88 may fit the holes in the link 85 loosely so as to admit of a slight degree of universal movement, sufficient to take care of the slight tilting movements of the axle. It is obvious, however, that the apex of the V could be supported in this modification from the transverse member in the same manner as shown in Figure 2, if desired.

In this modification the actuating cylinders 90 are directly carried between the long arms of the actuating levers 91 and 92, the actuating cylinders in this instance comprising a piston 93 connected to one lever as 91 and the cylinder 90 itself connected directly to the opposed lever 92. Air is admitted through the port 94 arranged at the inner end of the cylinder. As in the previous embodiment, tension springs 95 extending between the arms urge them to their inoperative positions where the stops 96 on the long arms engage the stop 97 on the transverse brake supporting member 98 which interconnects the legs of the U-shaped member 84 just beyond the brake discs and has the lateral extensions which support the brake shoes in the manner described in connection with Figures 1, 2 and 3.

In Figure 6 there is shown an emergency operating means associated with this modification. In this view one of the arms as 91 is shown with an extension 91*a* beyond its connection with the cylinder 90 and to this extension is pivoted a link 99, the opposite end of the link being connected by a pin and slot connection with a bell crank lever 100 which in turn is pivoted on the same pin which connects the cylinder 90 to the arm 92. Again as in the previous case the arm connected with the link 99 extends at right angles thereto and the opposite arms of the bell cranks extend inwardly toward each other. The bell cranks 100 on opposite sides of the truck are connected by links 101 to an equalizer bar 102 which in turn is connected to an actuating lever 103 by a link 104. A similar link 105 connects the lever 103 with an equalizing bar 106 connected in a manner similar to the connection through the bar 102 to the brake mechanism at the opposite end of the truck.

Figure 8:
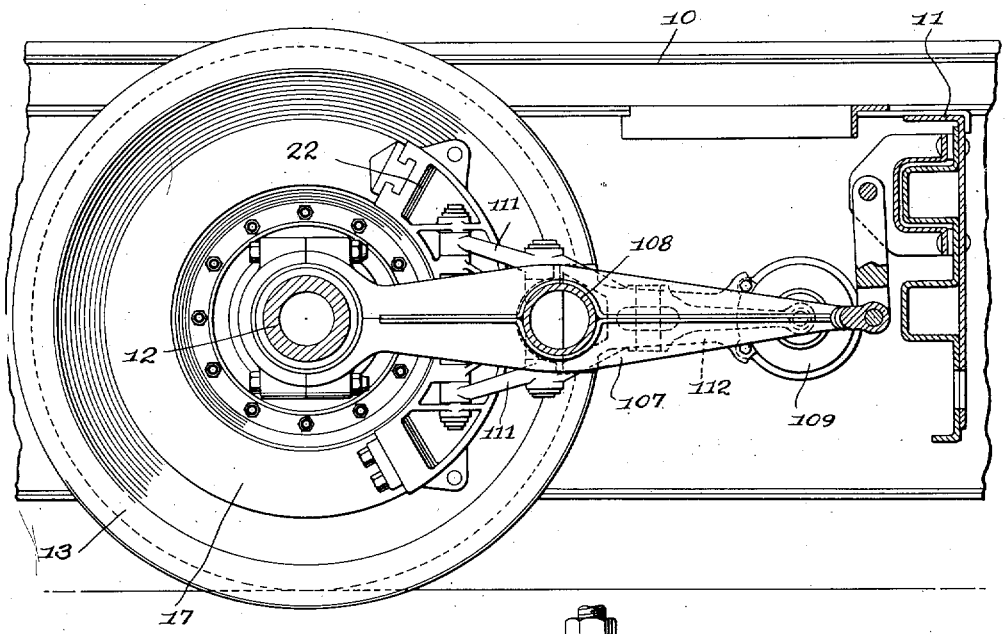
Figure 8 is a central vertical longitudinal section taken substantially on the line 8—8 of Figure 7 looking in the direction of the arrows at the ends of the section line.
Figure 9:
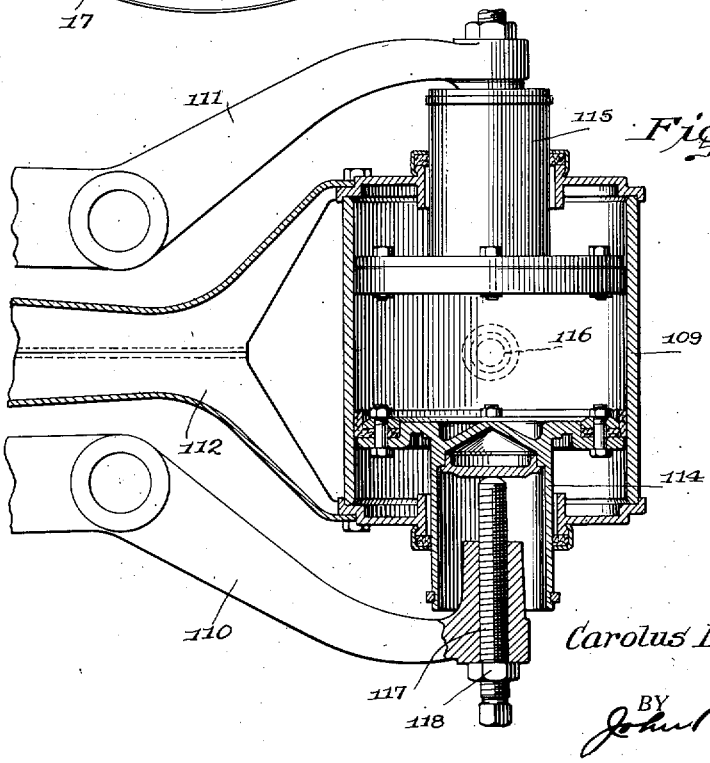
Figure 9 is an enlarged detail horizontal sectional view through the brake cylinder shown in Figures 7 and 8 showing one form of adjustment which may be used.

In the second modification shown in Figures 7, 8 and 9, another simplified form is shown in which the main frame members 107 forming the supporting yoke are arranged in the form of a V having a sharp apex, these members being interconnected by the heavy tubular transverse member 108 which supports the brake mechanism at its extended ends. The apex of the V is connected to the cross member in a manner very similar to that shown in the preceding modification and its legs are pivotally connected to the axle also in a manner similar to that shown in the preceding modifications.

In this modification as in the preceding the actuating cylinders 109 are arranged between the ends of the actuating levers 110 and 111 but they are not supported by these arms. Instead the cylinders 109 are supported by brackets 112 which are connected to the cross member 108 by a clamping arrangement 113 between the points of support of the levers 110 and 111 on said member. In this modification, as in the preferred form, the arms are acted on respectively by separate pistons 114 and 115 and the pistons are actuated by air admitted through the port 116 arranged between the pistons. In this modification no means is shown for moving the arms to their inoperative position or for limiting such movement but it is obvious that means similar to that disclosed in the other modifications could be employed.

In this modification means are provided for making an adjustment for wear, this means comprising an adjustable screw 117 locked in place by lock nut 118. It is obvious that this means of adjustment could also be utilized in the preferred form shown in Figures 1, 2 and 3.

While I have herein shown and described several specific embodiments of the invention and have shown it embodied in a railway truck, it will be understood that it may find use in other relations, such as in trucks and buses, and that further modification may be made, such as would readily fall within the skill of one versed in this art, and such uses and modifications are intended to come within the scope and spirit of the claims appended hereto.

What I claim is:

1. A unitary brake supporting frame adapted to be assembled with the railway truck as a unit, said frame having a pair of longitudinally extending members connected at one end to a truck axle, readily detachable means for so connecting them to the axle the opposite end of said members converging and being rigidly secured together and supported at said end from a transverse member of the truck by a readily detachable connection, and a transverse member intermediate the ends of said longitudinal members interconnecting them and forming the support for the brake mechanism.

2. A unitary brake supporting frame adapted to be assembled with a railway truck as a unit, said frame being of substantially A-shape in plan, the legs of the A and the apex of the A being readily removably secured, respectively, to the axle of a truck and to a transverse member of the truck frame, whereby the brake mechanism can be readily detached as a unit from the truck.

3. A unitary brake supporting frame for railway trucks having longitudinal members extending between a truck axle and a portion of the truck frame remote from said truck axle, said longitudinal members being connected by a cross member which serves to support the brake mechanism, and readily detachable connections between said members and the axle and the portion of the truck frame remote from the axle, whereby the brake mechanism can be readily detached as a unit from the truck.

4. In a vehicle brake, a rigid brake supporting frame unit including substantially rigid arms removably joined to an axle of the vehicle at one end thereof, the arms approaching each other at their opposite ends and rigidly joined together and removably joined to the vehicle frame at said location, the intermediate portions of said arms being transversely interconnected by a member adapted to support the brake shoes and their actuating mechanism, said removable connection permitting the frame to be readily detached as a unit from the truck.

5. A brake for railway trucks having an axle and rotatable wheels supporting the same, a pair of radial brake faces one rotatable with each of said wheels and disposed on opposite sides of the center of the axle, brake shoes mounted for axial movement to engage each of said brake faces to apply the brake, and a rigid generally V form frame supporting said brake shoes and having its arms secured to the axle at spaced points and its apex anchored to a remote portion of the truck frame.

6. A brake for a vehicle having a frame supported from the roadway by wheeled axles having limited vertical movement with respect to said frame, radial brake discs located adjacent the opposite ends of an axle and rotatable with the wheels, brake shoes mounted for axial movement to engage and disengage them with the brake discs, and a support for said shoes comprising a generally V-shaped frame structure having the ends of its arms supported, on said axle adjacent the discs and the apex of the V hingedly connected to a fixed portion of said frame remote from the axle.

7. A brake for a vehicle having a frame supported from the roadway by wheeled axles having limited vertical movement with respect to said frame, a pair of radial brake discs mounted adjacent to and connected, one for rotation with each wheel, brake shoes mounted for axial movement to engage the opposite sides of each of said discs to apply the brake and means for so moving them, a rigid support for said brake shoes and their moving means having one extremity mounted concentric with the axle at spaced points adjacent the wheels and the opposite end hingedly secured to a portion of said frame remote from the axle.

8. A railway brake associated with a wheeled axle including a transversely frame tied to the axle at widely spaced points to follow the vertical movements thereof, and universally supported at a point remote from the axle, said frame carrying brake shoes mounted thereon for axial braking movement and actuating means therefor including a fluid pressure device, and a radial brake disc rotatable with a wheel on said axle with a portion thereof extending between said shoes.

9. A railway brake for truck frames mounted on a vertically movable wheeled axle, and a radial brake disc rotatable with a wheel on said axle, a rigid brake supporting frame of generally triangulated form having its legs secured at widely spaced points to the axle and its apex universally supported on a portion of the truck frame remote from the axle, whereby the plane of the frame always passes through the axle, and brake shoes mounted on the frame are always maintained in proper relation to a radial brake disc rotatable with a wheel on said axle.

10. A brake for vehicles having a wheeled axle, a radial disc secured to rotate with a wheel on said axle, a pair of segmental brake shoes mounted for axial movement to engage opposite sides of the disc to apply the brake, a supporting frame for said shoes extending between the axle and a transverse member of the vehicle frame and pivoted to each, said frame including a transverse beam close to the periphery of said disc, a pair of actuating levers pivoted on said beam on opposite sides of the plane of said disc and having arms pivotally connected to the shoes substantially in the vertical transverse plane of their center of gravity, and arms extending from the opposite sides of their pivotal connection to the transverse beam, and a fluid-operated cylinder between said last-named arms for actuating the shoes.

11. A brake for vehicles having a wheeled axle, a radial disc secured to rotate with a wheel on said axle, a pair of segmental brake shoes mounted for axial movement to engage opposite sides of the disc to apply the brake, a transverse beam supported closely adjacent the periphery of the disc for supporting the shoes, said support including a pair of levers one hinged to each shoe on a pivot substantially in the vertical transverse plane of the center of gravity thereof, and each of the levers being pivoted to the transverse beam in substantially longitudinally aligned relation to its pivotal connection to the shoes.

12. A brake for vehicles having a wheeled axle, a radial disc secured to rotate with a wheel on the axle, a pair of brake shoes mounted for axial movement to engage the opposite sides of the disc to apply the brake, levers for actuating said shoes pivoted intermediate their ends to a support, said support being pivotally connected to the axle and a transverse member of the vehicle frame a fluid-operated cylinder between the ends of the levers remote from the shoes for actuating the same, and emergency operating means connected to said levers between the cylinder and their pivots on the support.

13. A brake for vehicles having a wheeled axle, a radial disc secured to rotate with a wheel on the axle, a pair of segmental brake shoes mounted for axial movement to engage the opposite sides of the disc to apply the brake, levers for actuating said shoes pivotally connected to said shoes and to a support, the pivotal connection being such as to substantially prevent subjecting the pivots to shear strains due to braking torque, the support for said shoes comprising a unitary frame flexibly connected to the axle and to a portion of the vehicle remote therefrom.

14. A brake for vehicles having a wheeled axle, a radial disc secured to rotate with a wheel on the axle, a pair of segmental brake shoes mounted for axial movement to engage the opposite sides of the disc to apply the brake, a transverse beam, levers supporting said shoes pivotally connected to said beam and to said shoes, and means on the shoes for maintaining them in parallel relation to each other and to the disc.

15. A brake for vehicles having a wheeled axle, a radial disc secured to rotate with a wheel on said axle, a pair of brake shoes for engagement with the opposite sides of the disc to apply the brake, a support for said shoes extending between the axle and a remote portion of the vehicle frame, actuating levers pivoted intermediate their ends on said support and having short and long arms, the short arms being pivoted to the shoes and the long arms having an actuating cylinder interposed therebetween.

16. A brake for vehicles having a wheeled axle, a radial disc secured to rotate with a wheel on said axle, a pair of brake shoes mounted for engagement with the opposite sides of the disc to apply the brakes, a support for said shoes extending between the axle and a remote portion of the vehicle frame, actuating levers pivoted intermediate their ends to said support and having short and long arms, the short arms being pivoted to the shoes and the long arms supporting an actuating cylinder between them.

17. A brake for vehicles having a wheeled axle, a radial disc secured to rotate with a wheel on said axle, a pair of brake shoes mounted for engagement with the opposite sides of the disc to apply the brakes, a support for said shoes extending between the axle and a remote portion of the vehicle frame, actuating levers pivoted intermediate their ends to said support and pivoted to the respective shoes through one of their arms and an actuating cylinder arranged between the other of their arms, said cylinder being mounted on said support.

18. A brake for vehicles having a wheeled axle, a radial disc secured to rotate with a wheel on said axle, a pair of brake shoes mounted for engagement with the opposite side of said disc to apply the brake, a support including a transverse beam, said support pivoted on the axle and a remote portion of the vehicle frame, actuating levers pivoted intermediate their ends on said transverse beam and each engaging one of said shoes through one of its arms, an actuating cylinder disposed between the other of the arms of said levers, and an arm supporting said cylinder from said transverse beam.

19. A brake for vehicles having a wheeled axle, a radial disc secured to rotate with a wheel on said axle, a pair of brake shoes mounted for engagement with the opposite sides of said disc to apply the brake, a pair of levers for actuating said shoes, and pivoted intermediate their ends on a support, the arms on one side of their pivots being connected to the respective shoes and their opposite arms being actuated by a brake cylinder, and means for independently adjusting said shoes associated with the arms actuated by said cylinder, the support for said shoes comprising a unitary frame flexibly connected to the axle and to a portion of the vehicle remote therefrom.

20. A brake for vehicles having a wheeled axle, a radial disc secured to rotate with a wheel on said axle, a pair of brake shoes mounted for engagement with the opposite sides of said disc to apply the brake, a transverse beam for supporting said shoes adjacent the periphery of the disc, actuating levers pivoted between their ends on said beam through bifurcated portions straddling said beam, the furcated ends of said levers being pivoted to the respective shoes.

21. A brake for vehicles having a wheeled axle, a radial disc secured to rotate with a wheel on said axle, a pair of brake shoes mounted for engagement with the opposite sides of said disc to apply the brakes, a transverse beam for supporting said shoes adjacent the periphery of the disc, actuating levers pivoted between their ends on said beam through bifurcated portions straddling said beam, the furcated ends of said levers being pivoted to the respective shoes, and a brace extending between the furcated ends adjacent the shoes.

22. A brake for vehicles having a wheeled axle, radial discs secured to rotate one with each wheel on the axle, a pair of brake shoes associated with each brake disc, and means for moving all of said shoes with equalized pressure into engagement with said discs, including an actuating lever associated with each shoe, the actuating levers associated with a disc one having a bell crank lever pivoted thereto and a link pivoted to the other and having a pin and slot connection with said bell crank lever, and an equalizer bar connected to the bell crank levers of the opposite pairs of shoes.

23. A brake for a vehicle having a frame supported from the roadway by a wheeled axle having limited movement with respect to said frame, a member having a braking face mounted for rotation with a wheel, a brake shoe mounted for movement to engage the braking face of said member to apply the brake and means for so moving it, a rigid support for said brake shoe and its moving means and having its one extremity pivoted to the axis and its opposite end hingedly secured to a portion of said frame remote from the axle for universal movement, and embodying resilient means cushioning the last named connection.

24. A brake for a vehicle having a frame supported from the roadway by a wheeled axle having limited movement with respect to said frame, a member having a braking face mounted for rotation with a wheel, a brake shoe mounted for movement to engage the braking face of said member to apply the brake and means for so moving it, a rigid support for said brake shoe and its moving means and having its one extremity pivoted to the axle and its opposite end pivotally suspended for universal movement by a link from a portion of the frame remote from the axle.

25. A brake for a vehicle having a frame supported from the roadway by a wheeled axle, a member having a braking face mounted for rotation with a wheel, a brake shoe mounted for movement to engage the braking face of said member to apply the brake and means for moving it, a rigid support for said brake and its moving means and having its one extremity pivoted to the axle and its opposite end supported by a link from a portion of the frame remote from the axle, shoulders on said link normally spaced from said support and resilient means normally maintaining said spacing, and cushioning the support when the brake is not applied, the support when the braking torque reaches a predetermined value overcoming the action of said resilient means and being brought into positive engagement with one of the other of said shoulders, dependent upon the direction of rotation of the wheel and the braking member rotating therewith.

26. A brake for a vehicle having a wheeled axle, a radial disc secured to rotate with a wheel on said axle, a pair of brake shoes for engagement with the opposite sides of the disc to apply the brake. a support for said shoes extending between the axle and a remote portion of the vehicle frame, actuating levers pivoted intermediate their ends on said support and having short and long arms, the short arms being pivoted to the shoes and the long arms having two independent operating means interposed therebetween, one mechanical and the other fluid-actuated.

27. The combination with a truck having side frames, a transverse member interconnecting said side frames, and wheeled axles carrying brake discs for rotation with the wheels and supporting the side frames adjacent their ends, of non-rotating brake members for cooperation with said discs and a support for said members disposed substantially in the horizontal plane of an axle in the space formed by said side frames, the axle and the transverse member, said support being connected at widely transversely spaced locations adjacent the wheels of said axle for carriage by the axle and having a third connection with the transverse member.

28. A brake for a vehicle having a frame and a wheel and axle assembly for supporting said frame and having limited vertical movement with respect to the frame and including a pair of widely spaced radial brake discs, one disposed adjacent to and connected to rotate with each wheel of said assembly, a non-rotatable brake shoe associated with each disc and mounted for axial movement to engage its associated disc to apply the brake and means for so moving the shoes into braking engagement, and a unitary supporting yoke structure for said shoes and their moving means, said structure having a portion transverse thereof disposed adjacent the peripheries of the discs and having widely spaced arms extending from said transverse portion to the wheel and axle assembly and supporting said structure for vertical movement with and limited rotation with respect to, said assembly, and cushioned means connecting and supporting said yoke structure from the frame remote from said assembly.

29. A brake according to claim 28, in which the supporting structure extends generally horizontally and the remote connection to the frame permits limited universal movement.

30. A brake mechanism comprising a wheel and axle, a brake ring connected therewith, brake shoes in cooperative relation with the opposite faces of the said ring, a brake yoke pivotally supported about the axis of the axle, means for preventing the yoke from turning about the said axis, and pressure fluid-actuated mechanism carried by the brake yoke and comprising two members movable in opposite directions, and connected one to each brake shoe, whereby fluid pressure will cause both brake shoes to engage the said brake ring.

31. A brake mechanism comprising a wheel and axle, a brake ring connected therewith, brake shoes in cooperative relation with the opposite faces of the said ring, a brake yoke pivotally supported about the axis of the axle, yieldable means associated with the yoke, allowing the said yoke to adjust itself to avoid stresses while preventing it from turning about the said axis, and pressure fluid-actuated mechanism carried by the brake yoke and comprising two members movable in opposite directions, and connected one to each brake shoe, whereby fluid pressure will cause both brake shoes to engage the said brake ring.

32. A brake mechanism comprising a wheel and axle, a brake ring connected therewith, brake shoes in cooperative relation with the opposite faces of the said ring, a brake yoke pivotally supported about the axis of the axle, means for preventing the yoke from turning about the said axis, a brake cylinder having a piston therein, means supported by the yoke and connecting the said cylinder and piston each to a corresponding one of the brake shoes, whereby relative motion of the piston and cylinder will actuate the said brake shoes.

33. A brake mechanism comprising a wheel and axle, a brake ring connected therewith, brake shoes in cooperative relation with the opposite faces of the said ring, a brake yoke pivotally supported about the axis of the axle, means for preventing the yoke from turning about the said axle, a brake cylinder having a piston therein, and levers pivotally mounted on the yoke and connecting the said cylinder and piston each to a corresponding one of the brake shoes, whereby relative motion of the piston and cylinder will actuate the said brake shoes.

34. A brake mechanism comprising a wheel and axle, a brake ring connected therewith, brake shoes in cooperative relation with the opposite faces of the said ring, a brake yoke pivotally supported about the axis of the axle, means for preventing the yoke from turning about the said axis, a brake cylinder having a piston therein, and levers pivotally mounted on the yoke and connecting the said cylinder and piston each to a corresponding one of the brake shoes, whereby fluid pressure in the cylinder will apply equal and opposite forces to the levers, thus equalizing the braking efforts of the brake shoes connected thereto.

35. A brake mechanism comprising a wheel and axle, a brake ring connected therewith, brake shoes in cooperative relation with the opposite faces of the said ring, a brake yoke pivotally supported about the axis of the axle, means for preventing the yoke from turning about the said axis, a brake cylinder having a piston therein, levers pivotally mounted on the yoke and connecting the said cylinder and piston each to a corresponding one of the brake shoes, means for supplying pressure fluid to the cylinder to actuate the said levers, and separate means for independently actuating the brake shoes, said separate means comprising a lost motion device whereby it will not interfere with the fluid pressure actuated brakes.

36. A brake mechanism comprising a wheel and axle, a brake ring connected therewith, brake shoes in cooperative relation with the opposite faces of the said ring, a brake yoke pivotally supported about the axis of the axle, means for preventing the yoke from turning about the said axis, and pressure-fluid actuated mechanism carried by the brake yoke, comprising two members movable in opposite directions, and connected one to each brake shoe, whereby fluid pressure will cause both brake shoes to engage the said brake ring, said yoke having a tubular cross piece, the axes of the axle, the cross piece, and the fluid-actuated mechanism being co-planar.

37. A brake for vehicles having a wheeled axle, a radial disc secured to rotate with a wheel on said axle, a segmental brake shoe mounted for axial movement to engage a side of the disc to apply the brake, a rigid support for said shoe supported at spaced points on the axle and frame, said support including a portion paralleling the axle and arranged in close proximity to the periphery of the disc, a lever for actuating said shoe pivotally mounted intermediate its ends on said portion of the support and having one end connected to the shoe to support the shoe against rotation with the disc, the connection of the lever to the support comprising generous interengaging bearing surfaces arranged at right angles to the pivot, said bearing surfaces being arranged to take substantially all the torque load due to braking without imposing any substantial shear strain upon the pivot.

38. A brake for a vehicle having a frame supported from the roadway by a wheeled axle having limited movement with respect to said frame, a member having a braking face mounted for rotation with a wheel, a brake shoe mounted for movement to engage the braking face of said member to apply the brake and means for so moving it, a rigid support for said brake shoe and its moving means and having its one extremity connected to the axle and its opposite end connected for universal movement on a portion of said frame remote from the axle, one of said connections embodying resilient cushioning means cushioning the movement of the support when the brake is not applied, but arranged, when the brake is applied to a predetermined degree, to become ineffective as a cushioning means in the direction in which the braking torque acts.

39. In a railway or other vehicle truck having transversely joined side frame members interconnecting longitudinally spaced wheel and axle assemblies, brake mechanism associated with a wheel and axle assembly and comprising spaced disc-like braking members associated one with, and lying closely adjacent to, each wheel of said assembly, segmental brake shoes adapted to cooperate, respectively, with said disc-like braking members, brake levers carrying the respective brake shoes, and a rigid brake support comprising a transverse beam extending at least substantially from wheel to wheel of said wheel and axle assembly and mounting said levers carrying the shoes, said brake support having spaced articulated connections with the truck affording relative movements between the brake support and truck without imposing undue stresses upon said support, a pair of said articulated connections lying on a common transverse axis which serves as a fulcrum for said support and being disposed, respectively, laterally near said spaced disc-like braking members and longitudinally in the region of said wheel and axle assembly, and another of said articulated connections being disposed laterally intermediate said pair of laterally spaced connections and radially removed from their said common transverse axis and serving to react against the braking torque.

40. The combination with a truck having transversely joined side frames, and a wheeled axle carrying brake discs disposed closely adjacent to, and rotating with, the wheels of said axle, of non-rotating brake shoes for cooperation, respectively, with said discs and a support for said shoes, carried by the truck and comprising a transverse beam extending at least substantially between said wheels and supporting the shoes adjacent the respective wheels, said support being carried by the truck by spaced articulated connections, including a pair of widely transversely spaced such connections arranged on a common transverse axis which serves as a fulcrum and located, respectively, adjacent the wheels of said axle and a third articulated connection radially remote from said common transverse axis and arranged to react against the braking torque.

41. A brake for railway trucks having a frame and a wheel and axle assembly, comprising a pair of radial braking faces, one rotatable with each of the wheels of said assembly and disposed closely adjacent the respective wheels of said assembly, brake shoes mounted on axial movement toward each of said braking faces to apply the brake, and a rigid frame supporting said brake shoes having three spaced articulated points of connection with the truck, two of said points of connection being disposed laterally in spaced relation near the respective wheels and on a common transverse axis longitudinally in the region of the wheel and axle assembly and serving as a fulcrum and the third being arranged remote from said axis and designed to react against the braking torque.

42. A brake for a vehicle having a frame supported from the roadway by a wheel and axle assembly, comprising a pair of brake discs mounted adjacent to and connected, one for rotation with each wheel of said assembly, brake shoes mounted for axial movement to engage the opposite sides of each of said discs to apply the brake and means for so moving them, and a rigid support for said brake shoes and their moving means having spaced articulated connections with the vehicle and having one longitudinal extremity mounted in the region of the axle through laterally spaced articulated connections with the vehicle arranged, respectively, adjacent the wheels of said assembly and the opposite longitudinal extremity articulated to a portion of the frame remote from the axle.

43. A brake for vehicles having a frame and a wheeled axle comprising a brake disc secured to rotate with a wheel on said axle, a pair of segmental brake shoes mounted for axial movement to engage opposite sides of the disc to apply the brake, a supporting frame for said shoes extending longitudinally from the region of the axle to a point where it is supported on the vehicle frame at a substantial distance from the periphery of said disc and including a transverse beam disposed between said point and the axle and close to the periphery of the disc, a pair of actuating levers pivoted on said beam on opposite sides of the plane of the disc, respectively, and having arms pivotally connected to and supporting the respective shoes substantially on the vertical transverse plane of their center of gravity, said arms forming the sole support of the respective shoes and said levers further having arms extending from the opposite sides of their pivotal connection to the transverse beam, and means operatively interposed between said last-named arms for actuating the shoes into braking engagement with the disc.

44. A brake for a vehicle having a wheeled axle, comprising a brake disc secured to rotate with a wheel on said axle, a pair of segmental shoes mounted for axial movement to engage the opposite sides of the discs to apply the brake, actuating levers to the ends of which said shoes are secured and which constitute the sole support for said shoes, a supporting member extending parallel with the axle, on which member said levers are pivotally mounted, each of said levers being constructed to straddle said member and having a pair of vertically spaced pivot bearings disposed at opposite sides of said member, whereby to substantially prevent subjecting the pivots to shear strains due to braking torque.

45. A brake for a vehicle having a frame and a wheeled axle, comprising a rotary brake element disposed closely adjacent to and rotating with a wheel on said axle, a brake shoe mounted for movement to engage said rotary element to apply the brake and means for so moving it, a rigid support for said brake shoe and its moving means having spaced articulated connections with said vehicle, a pair of said connections being disposed laterally near the respective wheels of said axle and longitudinally on a common transverse axis serving as a fulcrum in the region of the wheel and axle assembly and a third of said connections being radially spaced remote from said transverse axis, permitting universal movement of the support with respect to the vehicle and embodying cushioning means.

46. A brake for a vehicle having a frame and a wheeled axle, comprising a brake disc secured to rotate with a wheel on said axle, a pair of brake shoes movable to engage, respectively, the opposite sides of the disc to apply the brake, a support for said shoes extending longitudinally from the region of the axle to a remote portion of the vehicle frame, actuating levers pivoted intermediate their ends on said support and having their arms extending on one side of their pivots pivotally carrying the respective shoes and their opposite arms having two independent operating means interposed therebetween, one mechanical and the other fluid-actuated.

47. The combination with a truck having transversely interconnected longitudinally extending side frame members and a wheeled axle, of brake mechanism comprising brake discs disposed laterally adjacent the wheels of said axle, respectively, and rotatable with said wheels, non-rotating brake members for cooperation with the respective discs, a rigid support for said non-rotating brake members disposed substantially in the horizontal plane of said axle in the space between said side frame members, said support being flexibly connected at widely transversely spaced locations adjacent the wheels of said axle and arranged on a common axis serving as a fulcrum longitudinally in the region of said axle and being further flexibly connected at a point remote from the axle, said last named connection reacting against the braking torque.

48. A brake for a vehicle having a frame and a wheel and axle assembly, comprising a pair of widely transversely spaced brake discs, one disposed adjacent to and connected to rotate with, each wheel of said assembly, a non-rotatable brake shoe associated with each disc and mounted for axial movement to engage its associated disc to apply the brake and means for so moving the shoes into braking engagement, and a rigid supporting structure for said shoes and their moving means, said support having a transverse portion thereof mounting the shoes disposed closely adjacent the peripheries of said discs and having spaced articulated connections with the vehicle, a pair of said connections being widely spaced and laterally disposed, one near each wheel of said assembly, and longitudinally on a common axis serving as a fulcrum in the region of the axle, and a third such connection being disposed radially remote from said axis and arranged to take the braking torque reaction.

49. A brake for vehicles having a frame and a wheeled axle, comprising a brake disc secured to rotate with a wheel on said axle, a segmental brake shoe mounted for axial movement to engage a side of the disc to apply the brake, a rigid support for said shoe supported at longitudinally spaced points on the vehicle, one in the region of the axle and the other remote therefrom, said support including a portion mounting the shoe generally paralleling the axle and arranged in close proximity to the periphery of the disc, a lever for actuating said shoe pivotally mounted intermediate its ends on and straddling said portion of the support, said lever having one end connected to the shoe and forming the sole support of the shoe against rotation with the disc, the connection of the lever to the support comprising pairs of interengaging bearing surfaces arranged at right angles to the pivot and disposed at opposite sides of said portion of the support, said bearing surfaces being arranged to take substantially all the torque load during braking without imposing any substantial shear strain upon the pivot.

50. A brake for a vehicle having a frame and a wheeled axle, comprising a braking element rotatable with a wheel on said axle, a brake shoe mounted for movement to engage the rotatable braking element to apply the brake and means for so moving it, a rigid longitudinally extending support for said brake shoe and its moving means having its one longitudinal extremity supported on the vehicle in the region of the axle for movement about a transverse axis serving as a fulcrum and having its opposite end connected for universal movement on a portion of the vehicle remote from the axle, one of said connections embodying resilient cushioning means cushioning the movement of the support when the brake is not applied, but arranged, when the brake is applied to a predetermined degree such as obtains in normal braking, to become ineffective as a cushioning means in the direction in which the braking torque acts.

CAROLUS L. EKSERGIAN.